United States Patent [19]
Faris

[11] 3,750,171
[45] July 31, 1973

[54] DIPLEXED MULTI-FREQUENCY CW DOPPLER RADAR

[75] Inventor: William R. Faris, Berkley, Mich.

[73] Assignee: The Bendix Corporation, Southfield, Mich.

[22] Filed: Sept. 24, 1970

[21] Appl. No.: 75,056

[52] U.S. Cl.......................................... 343/9, 343/12
[51] Int. Cl............................. G01s 9/24, G01s 9/46
[58] Field of Search.................................. 343/9, 12

[56] References Cited
UNITED STATES PATENTS

| | | | |
|---|---|---|---|
| 3,168,735 | 2/1965 | Cartwright | 343/12 R |
| 3,611,377 | 10/1971 | Rittenbach | 343/12 R |
| 3,161,870 | 12/1964 | Pincoffs | 343/12 R X |

*Primary Examiner*—Malcolm F. Hubler
*Attorney*—Lester L. Hallacher and Plante, Hartz, Smith and Thompson

[57] ABSTRACT

This invention relates to a diplexed multi-frequency CW radar for use in the measurement of range and relative velocities between two vehicles. The radiated signal is modulated so that several frequencies are transmitted on a time-sharing basis. Doppler signals resulting from the reception of energy reflected from a target are gated to produce two composite doppler signals. Range to the target is proportional to the phase angle between the composite doppler tones and range rate is proportional to the frequency of the composite signal. The composite doppler signal can be represented as the vectorial summation of two component signals. The phase relationship between the two composite signals establishes range for all target ranges. However, the composite vectors are reduced to zero at a preselected maximum range and become ambiguous beyond that range. This provides range cut-off for the system. Ambiguous signals existing because of reflections from targets beyond the maximum range are below the threshold level of the system, and therefore, are of no consequence to the system.

14 Claims, 13 Drawing Figures

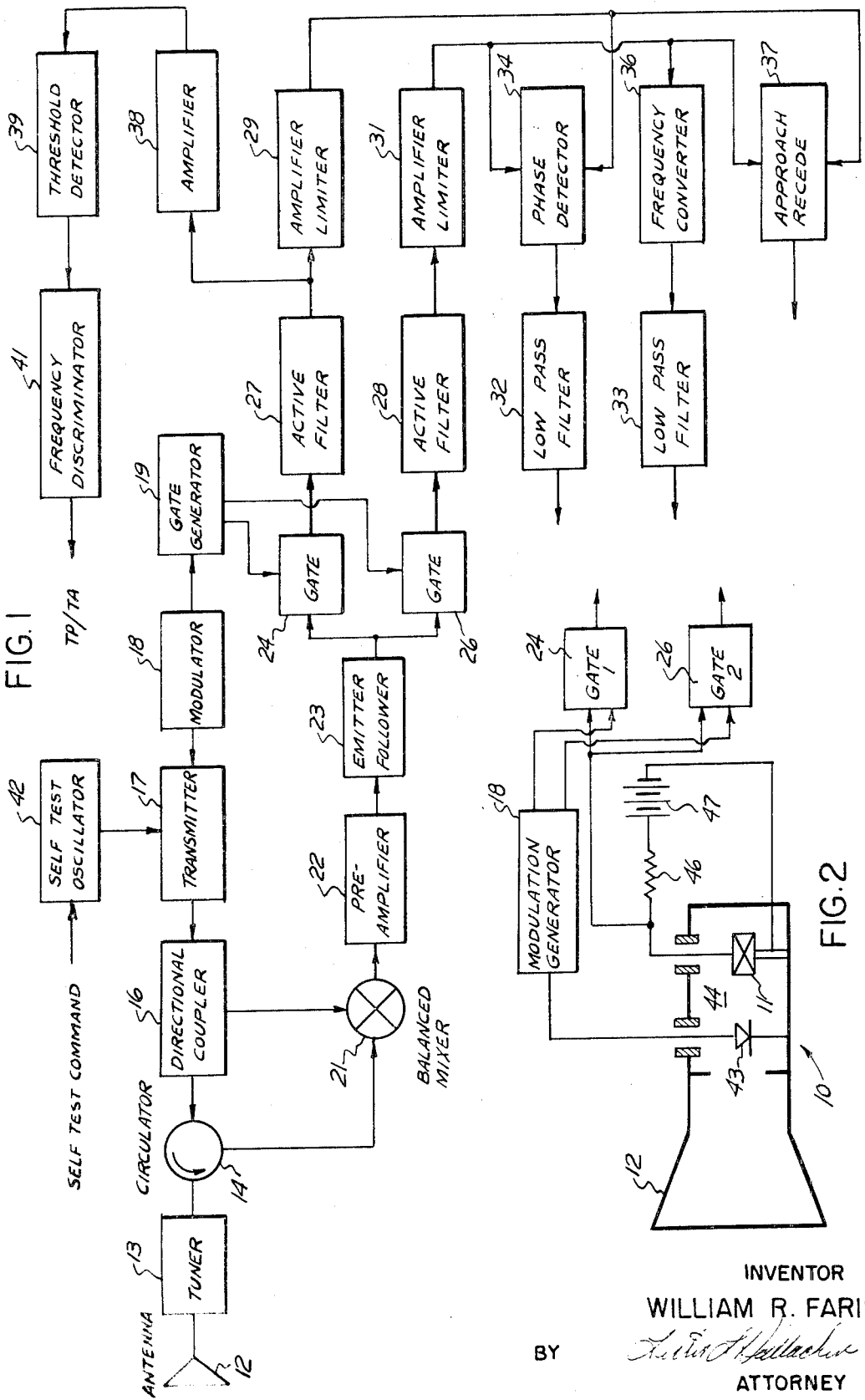

INVENTOR
WILLIAM R. FARIS
BY
ATTORNEY

DIPLEXED MULTI-FREQUENCY CW DOPPLER RADAR

BACKGROUND OF THE INVENTION

The rapidly increasing population of vehicles on the highways creates a need for automatic vehicle control systems which improve safety and assist in traffic flow and driver convenience, while allowing the driver to assume full control of the vehicle at his option.

Various types of automatic vehicle control systems are presently available and various other types have been proposed. One type of vehicle control system which is presently available is solely a driver convenience system, and provides automatic speed control of the vehicle. The vehicle is held at a preselected speed which is chosen by the driver consistent with traffic conditions. This type of system automatically maintains the vehicle at the preselected velocity irrespective of road grade and without any attention from the driver. However, the driver can assume control of the vehicle velocity by either braking or accelerating the vehicle at his option. This type of system is very convenient for the driver, especially for turnpike and long distance driving where a constant speed can be held for relatively long periods of time. However, such a system has little or no safety value and does not assist in maintaining smooth traffic flow in congested areas.

Various types of collision avoidance systems have also been proposed. These systems are intended to monitor the highway appearing before a traveling vehicle so that hazardous passing or driving conditions can be avoided. Accordingly, a driver attempting to pass a vehicle would be forewarned or prevented from passing if the possibility of a head-on collision with an oncoming vehicle existed. Alternatively, a vehicle traveling in the same direction as the radar bearing vehicle, which is involved in a collision or suddenly slows for some reason, presents a hazardous condition which would automatically be avoided by the instantaneous braking or turning of the radar bearing vehicle. The collision avoidance system must, therefore, be capable of overriding the driver and an automatic speed control system.

It has also been proposed to adapt a collision avoidance system to automatically maintain a safe traveling distance between vehicles traveling in the same direction. Accordingly, the latter type system presents a complete automatic control package in that it would permit convenient velocity maintenance and simultaneously monitor the highway for potential hazardous conditions. Although such systems are theoretically feasible, they are economically unfeasible, and accordingly, have not been adopted as of the present date.

Because of the economic infeasibility of adopting a complete collision avoidance system, several proposals exist for an adaptive speed control system. This type of system lies between the automatic speed control type of system, which is a convenience only, and the fully automatic collision avoidance system, which provides full roadway safety. Accordingly, the adaptive speed control system is intended to maintain a safe following distance between vehicles traveling in the same direction. For this reason, the system monitors the distance and closing rate or opening rate between two vehicles traveling in the same direction, and automatically brakes or accelerates the following vehicle to maintain an optimum following distance in accordance with the velocities of the two vehicles. The adaptive speed control system, therefore, offers the convenience of the automatic speed control system, but improves upon this type of system by maintaining an optimum vehicle spacing to thereby enhance traffic flow in congested areas. The adaptive speed control system can be overridden by manual inputs by the driver, such as braking or acceleration to thereby avoid a possible collision by manual rather than automatic means.

The inventive radar system described in this application is primarily directed to utilization in an adaptive speed control system for maintaining a constant and safe spacing between vehicles traveling in the same direction. However, although it is described basically in this environment, it is not to be so limited as it obviously can be used in many types of systems requiring the measurement of range and range rate between two relatively moving vehicles, or a moving vehicle and a stationary object.

The inventive systems can also be utilized as an aircraft instrument. The knowledge of the altitude of an aircraft is important information for many purposes. For this reason, many sophisticated ranging systems have been developed. A well known system is a pulsed radar system in which the time required for a transmitted pulse to return to the transmitting aircraft is a measurement of range. This type of system is very accurate at relatively high altitude. However, at lower altitude the received pulse may have returned so rapidly that it is undistinguishable from the transmitted pulse. The ability to obtain meaningful altitude, or range, information with a pulse type of system is therefore dependent upon the ability to retain resolution between the transmitted and received pulses. For this reason, the range at which accurate range information is obtained decreases proportionally with decreasing pulse width. However, this places a limitation on the systems because of the inability to reduce the pulse width to a value which is capable of yielding accurate range information for ranges less than approximately 50 feet. Furthermore, only the most expensive and sophisticated systems are useful inside of 150 feet.

The inventive system does not have sufficient power output to measure range beyond approximately 300 feet. However, it does yield accurate information within 50 feet. The inventive system is therefore useful as an addition to existing pulse radar systems.

Because of the economy of the inventive systems, it can also be used in aircraft which ordinarily would not contain radar systems because of the expense of existing systems. Accordingly, a private or general aviation aircraft could be equipped with the inventive system and thus be capable of accurate radar range measurement within the maximum capability of the system. Although the system would have a range limitation, it would nevertheless constitute a marked improvement over no radar at all.

SUMMARY OF THE INVENTION

The inventive radar system described herein is useful in an adaptive speed control system or as an aircraft ranging system of the types described hereinabove. The radar system is a diplexed multi-frequency CW doppler radar which is capable of measuring range and relative velocity between two vehicles or between a vehicle and a stationary target. Relative velocity is determined from the frequency of the doppler shift between transmitted and reflected signals. Range is proportional to the phase angle between composite doppler tones associated with each of two doppler channels. Range cut off is provided by using a complex modulation of the transmitted signal. Accordingly, four frequencies are transmitted. The composite doppler signal for each channel can be represented as the vector summation of two component signals. The two composite doppler signals together define the phase angle which determines the range between the target and the transmitting antenna. Therefore, although a phase relationship between the two doppler signals remains for all ranges, the composite vector disappears at the preselected range. This provides a range cut off which is defined by the maximum range intended for the inventive system. Although the composite vector reappears beyond the maximum range, it is greatly attenuated by the distance factor, and therefore, is well below the threshold level of the radar system.

An exemplary frequency is 16 GHz for operation of the system in an adaptive speed control system. A proposed antenna aperture for this frequency is 11 × 14 inches so that the antenna beam-width is in the order of 3.8° × 2.8° at the exemplary frequency. This narrow beam-width is preferable for the elimination of return signals from adjacent lane vehicles, road return, and reflections from fixed road side objects such as lamp posts and signs. A higher radar frequency which is in the band of 35 to 40 GHz would permit a reduction in the antenna aperture to approximately 6 inches while maintaining a narrow beam-width. The antenna is a uniformly excited resonant planar slotted array. The waveguide slots are cut on the narrow wall of the waveguide elements with space between the elements for cooling purposes. The slots are covered by a thin teflon coating to prevent deterioration by weather conditions and accumulations of dirt and tar, etc.

BRIEF DESCRIPTION OF THE DRAWINGS

FIG. 1 is a block diagram of a preferred embodiment of the inventive system.

FIG. 2 is a simplified diagram of a Gunn diode doppler radar system including the modulation generator and gates useful with the inventive system.

DETAILED DESCRIPTION

Figure 3:
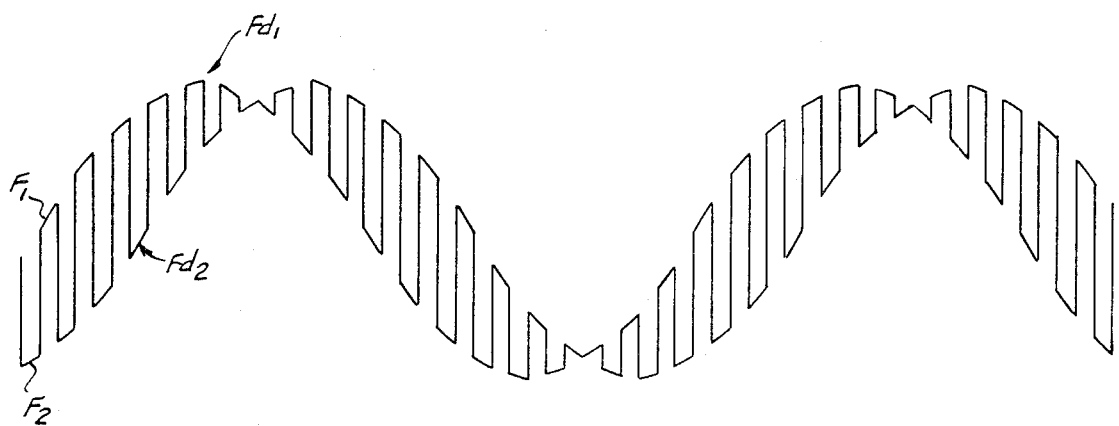
FIG. 3 shows a two frequency composite waveform which can be transmitted by the system of FIG. 1.

The preferred embodiment shown in FIG. 1 includes a transmitting-receiving antenna 12 which is coupled to transmitter 17 through a three port circulator 14 and a capacitance screw tuner 13. Circulator 14 serves to isolate the transmitter and receiver. Additional isolation is afforded by the tuner 13 which reflects a small amount of transmitted energy in the proper phase to cancel transmitter leakage.

The received signal is coupled to a balanced mixer 21 by way of circulator 14. A portion of the transmitted output is injected into mixer 21 by way of a directional coupler 16. The output of the mixer, therefore, contains the doppler tones which are the difference between the transmitted and received frequency. Because the transmitter frequency is switched back and forth between two frequencies $F_1$ and $F_2$, the doppler information is contained in alternate short bursts of energy which appear at the transmitter switching rate.

The switching of the transmitter frequency between the frequencies $F_1$ and $F_2$ is provided by a modulator 18. Modulator 18 also serves to actuate gate generator 19 which is used to gate the gate circuits 24 and 26 synchronous with the transmitter switching so that the received signal is properly gated to separate channels provided for the two distinct doppler frequencies.

The output of balanced mixer 21 is amplified in a low noise linear preamplifier 22 which has a band pass which is at least five times the transmitter switching rate. A high band pass is required in order to preserve the doppler information contained in alternate half cycles of the transmitter switching.

Figure 3A:
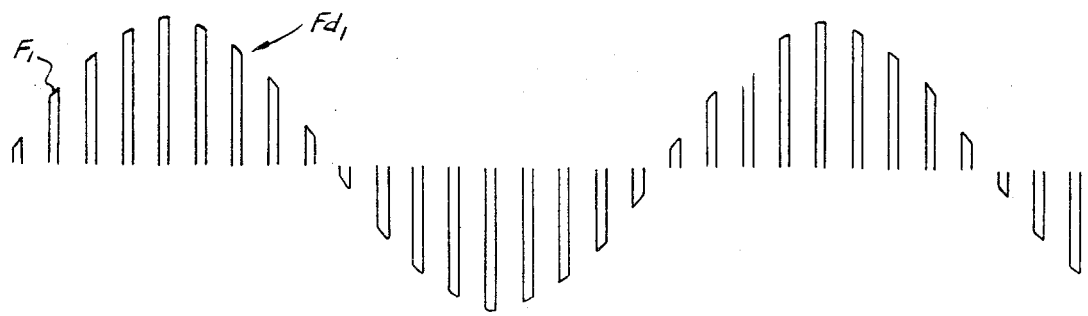
FIGS. 3a and 3b show the individual doppler signals which make up the composite signal shown in FIG. 3.
Figure 3B:
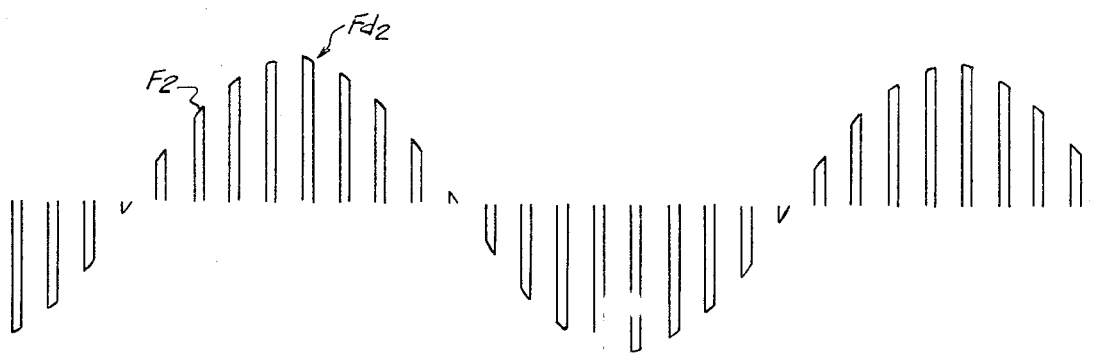

Reference to FIGS. 3, 3a and 3b provides a better understanding of the received signals. The composite waveform shown in FIG. 3 includes a first transmitted frequency $F_1$ and a second transmitted frequency $F_2$. The doppler information relative to the frequencies $F_1$ and $F_2$ is provided in the envelopes of the waveform. Accordingly, the doppler frequency $Fd_1$, which is associated with transmitted frequency $F_1$, is defined by the leading envelope of the waveform. In like manner the second doppler frequency $Fd_2$, associated with the other transmitted frequency $F_2$, is defined by the lagging envelope of the FIG. 3 waveform.

The FIG. 3 waveform, which is the output of the preamplifier 22, is coupled by way of emitter follower 23 to gating circuits 24 and 26. The composite waveform shown in FIG. 3 is applied to both gates 24 and 26. However, because the gate generator 19 actuates gates 24 and 26, synchronous with the transmitter switching, the waveforms shown in FIGS. 3a and 3b are individually injected into the two receiving channels. Accordingly, the doppler signal $Fd_1$ is gated to one channel while the doppler signal $Fd_2$ is gated to the other channel.

The doppler channel associated with gate 24 includes an active low pass filter 27 and an amplifier-limiter 29. Low pass filter 27 is used to limit the processing of doppler signals to those which are within the band corresponding to closing or opening velocities which are most likely to be encountered in headway control. Accordingly, a considerable rejection of doppler signals from fixed objects such as bridges, road signs, and trees is offered by the system.

In a similar manner, the doppler channel associated with gate 26 includes an active low pass filter 28 and an amplifier-limiter 31. These components serve to operate in the same manner as those associated with gate 24.

As an example, the doppler band pass can be approximately 1,000 $H_z$ which at a radar frequency of 16 GHz represents relative velocities from zero to 30 feet per second. It should be noted that these values are not represented as being optimum. A wider band pass would permit operation over a wider range of relative velocities at the expense of some fixed target rejection. Another means of fixed target rejection includes narrow band velocity gating. This technique could be employed if the band pass were widened to an extent which negated the benefits of fixed target rejection.

The amplifier-limiter circuits 29 and 31 contained within the two doppler channels amplify the outputs of the doppler filters to a level whereby an amplitude-insensitive phase measurement can be made. The outputs of both doppler channels are, therefore, injected into a phase detector 34 which measures the phase angle existing between the doppler frequencies $Fd_1$ and $Fd_2$ shown in FIGS. 3a and 3b, respectively. The output of phase detector 34 is a DC voltage which is proportional to the phase shift between the two doppler signals, and therefore, is indicative of the range between the target and the transmitting antenna. The direct proportionality of the output of phase detector 34 to range holds true over a target range represented by a phase from 0° to 180°. Beyond 180° the output of the phase detector voltage decreases and is thus ambiguous.

The maximum range, or the range beyond which the phase angle becomes ambiguous, is a function of the two transmitted frequencies $F_1$ and $F_2$. This is defined by the equation:

$$\Delta\phi = (4\pi R\Delta F)/c \qquad (1)$$

where:

$c$ = the velocity of light
$R$ = range
$\Delta F = F_2 - F_1$
$\Delta\phi$ = the phase angle Equation 1 shows that an increase in the range at which the ambiguity occurs can be accomplished simply by decreasing the value $\Delta F$. Alternatively, a decrease of the range at which the ambiguity occurs can be accomplished by increasing the value $\Delta F$.

Irrespective of the desired critical range, some signals in the ambiguous range may be accepted from large targets which are present in the favorable aspect. This difficulty can be greatly alleviated by providing a threshold above which targets are accepted and below which received signals are rejected.

The description so far has been directed to the embodiment shown in FIG. 1 which includes the directional coupler 16, balanced mixer 21 and circulator 14. A radar system employing these elements is perfectly effective in the type of system desired. However, economic considerations require simplification to the largest extent possible. An embodiment consistent with the economic consideration is shown in FIG. 2.

In FIG. 2 a transmitter generally indicated by reference numeral 10 includes a Gunn diode 11. Gunn diode 11 serves as both the transmitter oscillator to generate the transmitted frequencies $F_1$ and $F_2$ and also as a frequency converter, or mixer, to derive the two doppler frequencies $Fd_1$ and $Fd_2$. In order to achieve the transmission of two discrete frequencies, it is necessary to tune the Gunn diode 11. This is accomplished by use of a varactor 43 which is placed within the resonating cavity 44 of the Gunn diode transmitter. As is well known, a varactor is a capacitive element which changes its impedance in response to a varying voltage applied thereto. Accordingly, the impedance seen by Gunn diode 11 is varied in accordance with the variation of the impedance of the varactor 43. This change in impedance results in the transmission of the two discrete frequencies $F_1$ and $F_2$.

The required impedance changes of varactor 43 can be achieved by use of modulation generator 18. By using a square wave generator, the transmitted frequency changes between the frequencies $F_1$ and $F_2$ at the frequency of the square wave generator. The rate of change of modulation is selected to be higher than the highest doppler frequency of interest.

The required modulation can also be achieved by coupling modulation generator 18 to the Gunn diode 11 and voltage tuning the Gunn diode in this manner. This is an acceptable method, however, it is possible that some undesired amplitude modulation could occur.

Energy for the oscillation of Gunn diode 11 is provided by a voltage source 47 which is coupled to the diode 11 through a resistor 46. Reflected energy is received by the antenna 12 and is mixed with the transmitted energy by Gunn diode 11 so that the doppler signals are present across the Gunn diode 11. These signals are coupled to gates 24 and 26 for separation into the two doppler channels in a manner similar to that associated with the embodiment shown in FIG. 1. Accordingly, modulation generator 18 is also coupled to gates 24 and 26 so that the synchronous switching of gates 24 and 26 occurs.

As mentioned hereinabove, the desired operation can be achieved by square-wave modulating Gunn diode 11 or the transmitter 17 shown in the FIG. 1 embodiment. In these instances, range cut-off can be provided by properly adjusting the differences between the two transmitted frequencies to increase the range at which the ambiguity occurs. Although this is a possibility, it has disadvantages because errors in phase measurement are more critical and have a greater bearing on the range measurement. A preferable means of providing range cut off involves frequency shifting the transmitted signal so that a composite signal is derived for each of the two doppler channels. A modulation scheme which is simple to implement and which will operate in this manner is described with respect to the waveform shown in FIG. 4.

Figure 4:
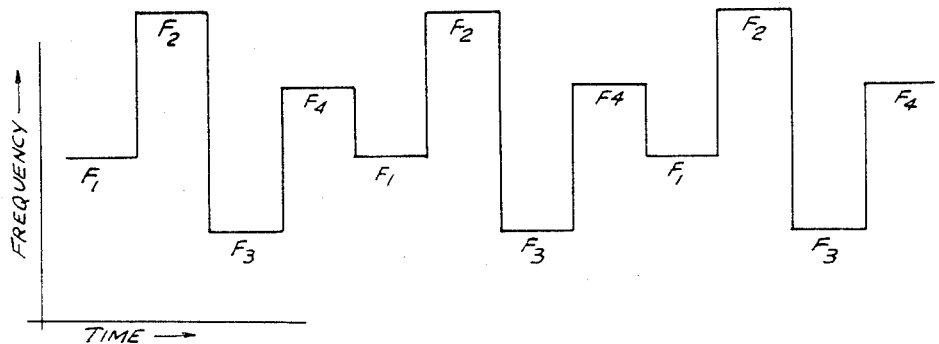
FIG. 4 shows the four-frequency variation of the transmitted signal used to realize range cut-off.

An effective range cut-off can be achieved by transmitting the four frequencies $F_1$, $F_2$, $F_3$, and $F_4$ in the time sequence illustrated in FIG. 4. The four transmitted frequencies are selected such that:

$F_2 = F_1 + \Delta F$
$F_4 = F_3 + \Delta F$
$F_1 - F_3 = \Delta F/2$
$F_2 - F_4 = \Delta F/2$.

The timing of transmission of the four frequencies is illustrated in FIG. 4. The two frequencies $F_1$ and $F_3$ are transmitted at a time when the doppler channel $Fd_1$ is gated open, while the two frequencies $F_2$ and $F_4$ are transmitted as when the doppler channel $Fd_2$ is gated open.

Accordingly, the two doppler channels each receive two doppler signals which form a composite doppler signal. One of the composite signals is composed of the doppler signals $Fd_1$ and $Fd_3$, and the other composite signal is composed of the two doppler signals $Fd_2$ and $Fd_4$. The doppler signals applied to the two channels are, therefore, the vectorial sum of the two doppler signals for each channel. This is illustrated with respect to FIG. 5 where the vectorial summation for several typical ranges is shown.

Figures 5A, 5B, 5C, 5D:
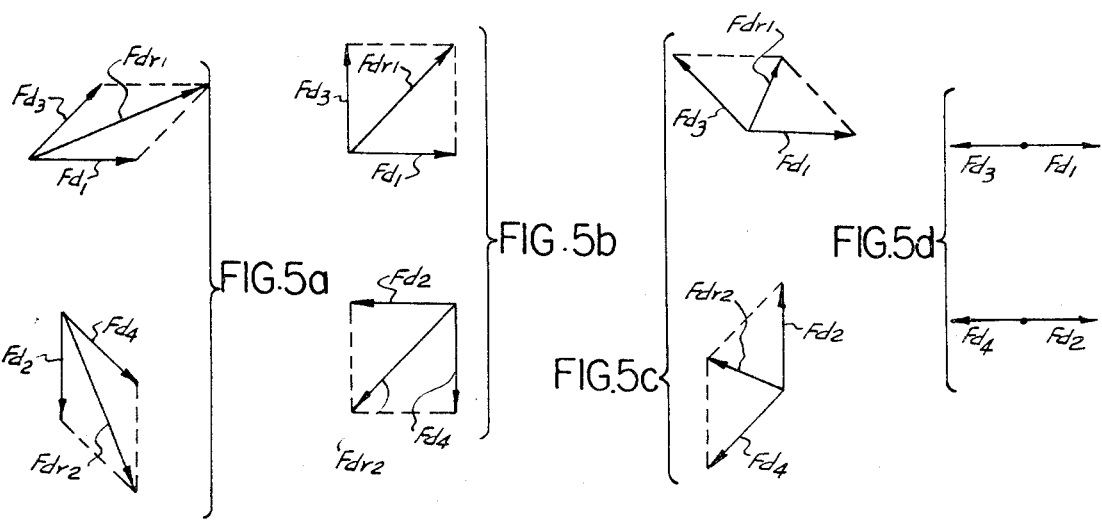
FIG. 5 shows a series of vectorial relationships between the transmitted frequencies which are useful in describing the range cut-off feature of the inventive system.

FIG. 5a is representative of the two doppler signals $Fd_{r1}$ and $Fd_{r2}$ which would be received at an exemplary range of 150 feet. The two doppler frequencies $Fd_1$ and $Fd_3$ combine to form the resultant composite doppler signal $Fd_{r1}$. In like manner, the two doppler signals $Fd_2$ and $Fd_4$ result in the composite doppler signal $Fd_{r2}$. FIG. 5b shows a similar situation for a range of 300 feet. However, it should be noted that the resultant doppler signal $Fd_{r1}$ is smaller in amplitude than the resultant doppler frequency $Fd_{r1}$ for the 150 foot range.

The decrease of the resultant vector is exemplified by reference to FIG. 5c which represents a range of 450 feet where $Fd_{r1}$ is still smaller than it is in FIG. 5b. In FIG. 5d, which represents a 600 foot range, the resultant doppler signals have been reduced to zero, as would be expected because the two component signals are 180° out of phase.

Although the amplitude of the two resultant doppler signals $Fd_{r1}$ and $Fd_{r2}$ is reduced to zero at a maximum range of 600 feet as selected for the illustration, a phase relationship is maintained between component vectors. Accordingly, the phase relationship between $Fd_{r1}$ and $Fd_{r2}$ in FIG. 5a is 90°. This is the same as the phase relationship between the two component vectors $Fd_1$ and $Fd_2$ and the two component vectors $Fd_3$ and $Fd_4$. Reference to FIGS. 5b, 5c, and 5d shows that the phase relationship between doppler frequencies resulting from alternately transmitted frequencies holds true for all ranges.

The reduction of the resultant doppler vectors to zero at a given range provides an adequate range cutoff for the radar system. However, it should be noted that beyond the maximum selected range, the resultant vectors again begin to appear with the proper phase relationship. However, reflected signals from targets beyond the maximum range will be well below the threshold of the system, and therefore, the system will be insensitive to these signals.

Figure 7:
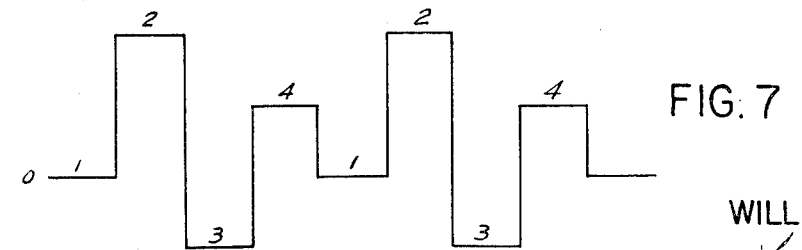
FIG. 7 shows the complex modulating signal resulting from the addition of the waveforms shown in FIGS. 6a and 6b.

In order to transmit the four discrete frequencies $F_1$, $F_2$, $F_3$, and $F_4$, it is necessary to modulate the transmitter in accordance with a waveform resulting in these frequencies. This is illustrated with respect to FIG. 7 where an exemplary complex waveform capable of achieving the required modulation is shown. In FIG. 7 the four levels 1, 2, 3, and 4, respectively represent the four frequencies $F_1$, $F_2$, $F_3$, and $F_4$. Accordingly, modulation generator 18 shown in FIG. 2 would be capable of generating this type of waveform.

Figure 6A:
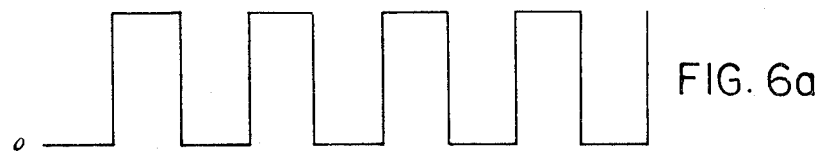
FIGS. 6a and 6b show the individual waveforms which can be used to form the composite modulating frequency so that the transmission of the frequencies shown in FIG. 4 is achieved.
Figure 6B:
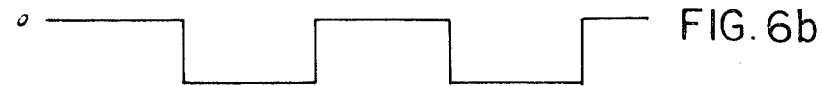

Although various methods of generating the complex waveform shown in FIG. 7 are available, it should be noted that the two simple waveforms shown in FIGS. 6a and 6b can be added to result in the waveform shown in FIG. 7. Therefore, modulator generator 18 can include two simple generators which are individually capable of generating the two simple waveforms shown in FIGS. 6a and 6b. It should be noted that the waveform of FIG. 6b is obtained by division in frequency of the waveform in 6a so that the waveform of FIG. 6b is exactly half the amplitude and frequency of the FIG. 6a waveform.

It should also be noted that the gating of gates 24 and 26 is such that gating occurs between each of the four transmitted frequencies. Accordingly, one gate is open when the frequencies $F_1$ and $F_3$ are transmitted, and the other gate is open when the frequencies $F_2$ and $F_4$ are transmitted. Because the required gating of gates 24 and 26 makes it necessary to switch the gates between each of the four frequencies, the waveform shown in FIG. 6a can be used as the gating signal.

Referring again to the two doppler channels associated with the transmitter of the embodiment shown in FIG. 1, it is seen that the outputs from the two channels are injected into a phase detector 34, the output of which energizes a low pass filter 32 which rejects high frequency components so that the output of low pass filter 34 is a DC voltage which is representative of the range between a target and a transmitting antenna 12. It should be understood that the doppler channels shown in FIG. 1 would also be associated with the embodiment shown in FIG. 2.

The output of either of the doppler channels is also injected into a frequency converter 36, the output of which energizes a low pass filter 33 so that the output of the low pass filter 33 is a DC voltage representative of the range rate between the target and the transmitting antenna 12.

An approach-recede detection circuit 37 also receives the output from both the doppler channels. The output of this circuit is indicative of the approach or recede relationship between the target and the antenna 12, accordingly, this voltage is a DC voltage, the polarity of which is indicative of the direction of relative velocity between the two vehicles. It should be noted that the output of phase detector 34 can also be utilized to give this indication.

After passing through active filter 27 the output of gate circuit 24 is injected into a frequency discriminator 41 through an amplifier 38 and threshold detector 39. The output of frequency discriminator 41 is used to give an indication of whether a target is present or absent in accordance with the threshold value set in detector 39. Accordingly, targets beyond the maximum preselected range will be below this threshold and a target absent indication will be given. Alternatively, when a target is within the maximum preselected range, a target present indication is given.

A target presence signal is necessary because of errors in measurement of range and range rate for weak signals. Weak signals occur at long ranges because of $1/R^4$ attenuation. Fading signals also occur at short range because of multi-path reflections which may add in phase opposition to the direct signal.

The radar systems are periodically self-tested by means of a low frequency signal which is applied to the transmitter. This signal results in some amplitude and frequency modulation which appears at the output of the mixer as a single doppler tone at the modulation frequency. The self-test signal is applied by means of self-test oscillator 42 as shown in FIG. 1. The self-test signal is gated through both doppler channels and appears at the sensor output as a target present signal. The range is zero because there is no phase shift between doppler signals and the range rate corresponds to the modulation frequency. As an example, the system can be self-tested for a period up to 1.5 seconds every 34 seconds. The system would preferably self-test only during periods of targets absent, and accordingly no self-test would be commanded until 34 seconds after a target is absent. If a critical component such as the Gunn diode or preamplifier should fail, the target absent condition during self-test would result in an indication of failure on the vehicle and the system would automatically be disconnected from the vehicle control elements.

What is claimed is:

1. A homodyne doppler radar system for yielding range, range rate and approach-recede information relative to a target and said radar system comprising:

a transmitter for transmitting signals;

a receiver for receiving reflected signals;

means for mixing said transmitted signals and said reflected signals for producing doppler signals;

means for frequency modulating said transmitter so that at least two discrete frequencies are transmitted and at least two doppler signals are produced by said means for mixing;

individual doppler channels for individually receiving each of said doppler signals;

individual gate means associated with respective ones of said channels so that said channels are responsive to said means for mixing;

said gate means being responsive to said means for modulating so that said doppler channels are sequentially switched on and off as said discrete frequencies are sequentially transmitted;

doppler phase comparison means receiving said doppler signals and producing an output indicative of the range between said target and said systems;

range rate indicative means for receiving either of said doppler signals and producing an output indicative of the relative velocities of said target and said systems; and approach-recede means for receiving said doppler signals and generating an output indicative of the opening or closing relationship of said target and said system;

2. The system of claim 1 wherein signals at four discrete frequencies are sequentially transmitted, two of said frequencies cooperating to form one of said doppler signals and the other two frequencies cooperating to form the other of said doppler signals.

3. The system of claim 2 wherein said doppler phase comparison means receives said first and second composite signals so that said output indicative of range is proportional to the phase difference between said composite signals, a phase difference existing for all ranges between said system and said target but the amplitudes of said composite signals gradually becoming zero at a preselected range to provide a maximum range cut-off for said system.

4. The system of claim 1 wherein signals of four discrete frequencies are transmitted, the first and second of said frequencies alternately actuating the first and second of said doppler channels respectively, and the third and fourth of said frequencies alternately actuating the first and second of said doppler channels respectively, the first and third of said frequencies sequentially actuating said first channel and the second and fourth of said frequencies sequentially actuating said second channel so that the first and third of said frequencies cooperate in the production of a first composite doppler signal and the second and fourth of said frequencies cooperate in the production of a second composite doppler signal.

5. The system of claim 1 wherein signals at four discrete frequencies are transmitted on a sequentially timed basis so that said four frequencies are alternatively gated to said first and second doppler channels, the first and third of said doppler signals forming a first composite doppler signal, and the second and fourth of said dopplersignals forming a second composite doppler signal.

6. The system of claim 5 wherein said transmitter, said receiver and said means for mixing are provided by a Gunn diode.

7. A doppler radar system having range cut-off capability comprising:

means for generating and transmitting signals at four discrete frequencies;

means for receiving reflected signals, said reflected signals being individually mixed with said discrete frequencies to produce four component doppler signals;

a first and a second composite doppler channel;

gating means for gating two of said component doppler signals to said first doppler channel to form a first composite doppler signal, and for gating the other two of said component doppler signals to said second doppler channel to form a second composite doppler signal, the phase difference between said composite doppler signals being indicative of the range between said radar system and a target, and the amplitudes of said composite signals approaching zero as a 180° phase difference between said component signals is approached so that a maximum range for said system is defined by said two composite doppler signals.

8. The system of claim 7 wherein said four frequencies are defined as $F_1$, $F_2$, $F_3$, and $F_4$ and:
$F_2 = F_1 + \Delta F$
$F_4 = F_3 + \Delta F$
$F_1 - F_3 = \Delta F/2$
$F_2 - F_4 = \Delta F/2$.

9. The system of claim 8 wherein said means for generating and transmitting includes a voltage sensitive element, and modulation means for producing a waveform for modulating said voltage sensitive element to cause the transmission of said four frequencies $F_1$, $F_2$, $F_3$, and $F_4$.

10. The system of claim 9 further including self-test signal generating means for generating a test signal, said test signal being coupled to said first and second doppler channels so that the proper functioning of said system is periodically tested.

11. The system of claim 10 wherein said test signal is coupled to said doppler channels through said transmitter.

12. The system of claim 9 further including threshold establishing means receiving an input from one of said gating means, said threshold establishing means yielding a target present indication when said gating means provides an input above a preselected level and a target absent indication when said gating means provides an input below said preselected level.

13. The system of claim 12 wherein said voltage sensitive element is a varactor and said means for generating and transmitting includes a Gunn diode.

14. The system of claim 13 further including phase detection means for receiving said composite doppler frequencies from said first and second doppler channels for producing a signal proportional to the phase difference between said composite doppler signals, said proportional signal being indicative of the range between a target and said system;

a frequency converter receiving either of said composite doppler signals and producing a range rate signal in response to said doppler signal;

and signal comparison means for receiving said composite doppler signals and producing a polarity signal, one polarity of said signal comparator indicating that said target is advancing with respect to said systems and the other polarity indicating that said target is receding with respect to said system.

* * * * *